United States Patent Office 2,966,738
Patented Jan. 3, 1961

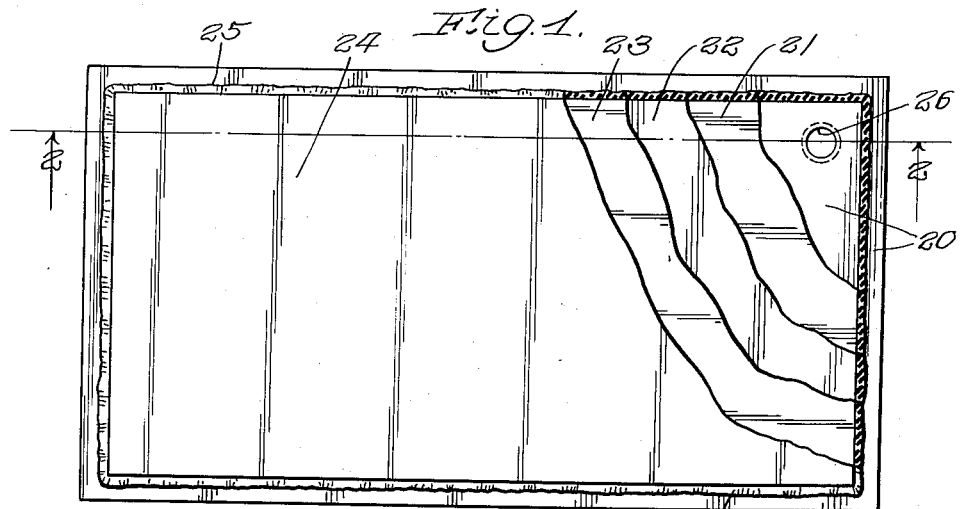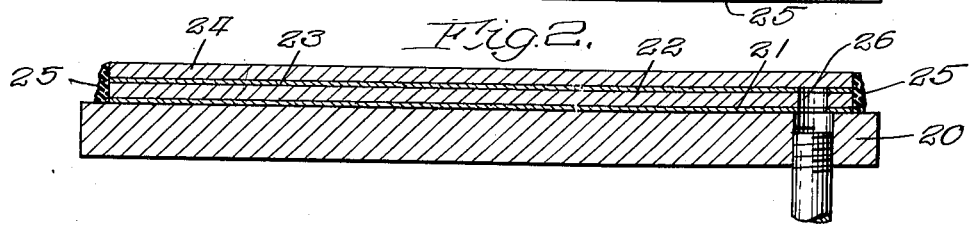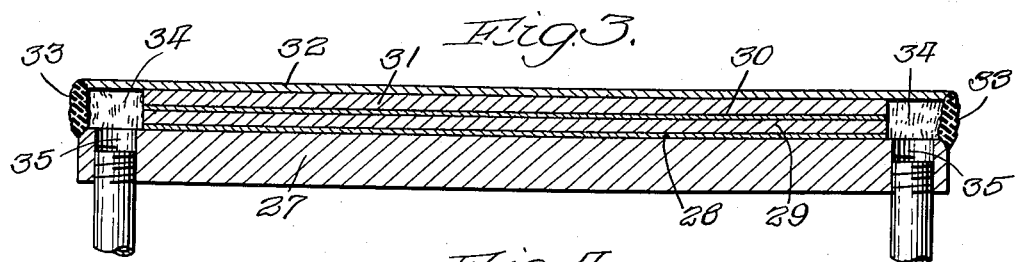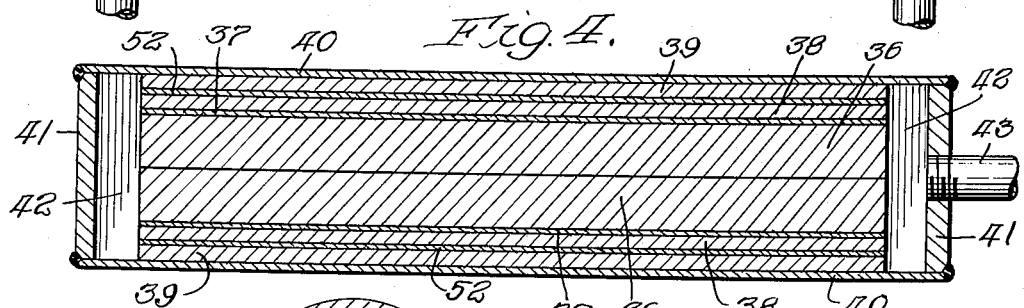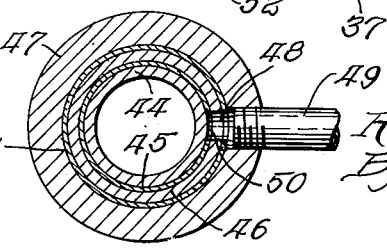

2,966,738

MOLYBDENUM CLAD PRODUCT HAVING AN INTERMEDIATE METAL LAYER AND METHOD OF PRODUCING THE SAME

Robert C. Bertossa, Birmingham, Ala., assignor to Chicago Bridge & Iron Company, a corporation of Illinois Filed Jan. 3, 1955, Ser. No. 479,545

12 Claims. (Cl. 29—196)

This invention relates to clad metal products. More particularly, this invention is concerned with molybdenum-clad metal products formed by brazing under vacuum.

In the United States patent of Robert L. Brown, No. 2,713,196, issued July 19, 1955, there is disclosed an entirely new method of producing clad metal products. The Brown process comprises essentially the cladding of one metal onto a base metal by placing a suitable brazing material between the metals, producing a vacuum between the metals, heating the evacuated sandwich until brazing is effected, subsequently cooling the sandwich and releasing the vacuum. The clad materials formed by this vacuum-brazing process are distinguished from other clad products by having an integrally continuous brazed bond between the clad and base metal and a uniform thickness of clad metal throughout its area.

The Brown process described above can be used in the cladding of molybdenum to base metals such as carbon steel and stainless steel sheets, plates and the like. A good bond between the molybdenum and such base metals may be attained by vacuum brazing, but failures of the bond sometimes occur when the clad product is cooled after brazing, particularly in the larger clad products. The primary cause of such failures upon cooling is probably internal stress set up by the considerable difference in coefficients of expansion between molybdenum and the more common metals, particularly the steels. Although such failures do not invariably occur, loss of material and labor are entailed when they do. In addition, such molybdenum-clad products cannot be severely formed without risk of fracturing the bond.

An object of this invention therefore is to provide molybdenum-clad materials which are securely and uniformly bonded and which are substantially free of stresses that would impede the normal forming and working of such materials. Another object is to provide a highly satisfactory process of producing such molybdenum-clad materials in a routine maner in which manufacturing failures are practically eliminated. A further object is to provide a process of making molybdenum-clad materials by vacuum brazing which is relatively simple and does not require special equipment nor involve complicated procedures. Other objects will be apparent from the following description of the invention.

According to this invention, there is provided a novel molybdenum-clad material which comprises a layer of molybdenum, a layer of tantalum, columbium, or zirconium and a layer of a base metal, such as steel, bonded together with a suitable brazing metal. In such molybdenum-clad composite sandwiches, the tantalum, columbium, or zirconium layer forms the intermediate layer between the molybdenum and base metal.

Molybdenum-clad composite plates of the type described are produced by vacuum brazing the metal sheets using a suitable cladding sandwich for this purpose. Representative cladding sandwiches that may be used are shown in the attached drawings in which:

Figure 1 is a plan of one type of cladding sandwich;
Figure 2 is a section of the cladding sandwich shown in Figure 1, the said section being at 2—2;
Figure 3 is a cladding sandwich in which a cover plate is used in the brazing operation;
Figure 4 is a double-sandwich with cover plates; and
Figure 5 is a representative cladding sandwich which may be used for producing internally molybdenum-clad tubes.

The integrally bonded molybdenum-clad products of this invention may be produced by taking a base plate 20 having one face sufficiently clean for brazing, placing a brazing material 21 in contact with said face of the base plate to be clad, placing a sheet of tantalum, columbium, or zirconium 22 over the brazing material in substantially face-to-face arrangement, covering the free face of the tantalum, columbium, or zirconium with a brazing material 23, placing in face-to-face contact with this second layer of brazing material a sheet of molybdenum 24, hermetically sealing the edges 25 of the sandwich, evacuating air from the sandwich by means of outlet 26 until a substantial vacuum is attained, heating the sandwich while evacuated so that the brazing material becomes molten and wets the metals, cooling the sandwich, releasing the vacuum and trimming the edges of the cladding sandwich.

Various base metals may be clad in this manner, but the process is particularly valuable for cladding ferrous sheets and plates, including austenitic steels and stainless steels. When clad with molybdenum, the clad products have the combined strength of steel and the passivity of molybdenum to corrosive influences. Cladding of base metals ⅛" and below to about 1" or more in thickness is easily accomplished by this invention.

A wide variety of brazing materials may be used to effect the bonding. In addition, different brazing materials may be used between the base metal and tantalum, columbium, or zirconium layers, and between the tantalum, columbium, or zirconium and molybdenum layers that comprise the sandwich. Copper is a particularly useful brazing material because it has good wettability for all the metals involved. Copper brazing foil of about 0.002 to 0.05 inch thick gives a bond of good strength which holds firmly in forming operations.

The molybdenum, tantalum, columbium, and zirconium sheets may be of any suitable thickness. However, because of the cost of these materials, it is ordinarily desirable to use relatively thin sheets. Thicknesses of about 0.001" to about 0.10" are considered quite adequate for producing clad sheets suitable for many uses.

Brazing temperatures and conditions are dependent on the particular brazing materials employed. Generally, temperatures of about 1500° F. to 2100° F. and furnace times of about fifteen minutes to two hours are sufficient to effect brazing but these conditions may be altered according to the brazing materials and other factors involved.

A vacuum of greater than 17", and preferably about 28–29", of mercury is used during the brazing. In this way oxidizing and embrittling of the metals is prevented and an integrally secure bond is attained. Vacuums as high as 60 microns and greater give the best results.

Following heating, the cladding sandwich is cooled during which the vacuum is retained. Slow cooling is preferred to give a clad product of greatest ductility. Cooling of about 200° F. per hour gives good results.

After the cladding sandwich has cooled to about room temperature, the vacuum is released and the seal removed such as by trimming. The molybdenum clad plate is then ready for fabrication purposes or forming.

Other vacuum cladding sandwiches than shown in Figures 1 and 2 may be used. Thus, a cladding sandwich may be prepared as in Figure 3 wherein 27 is a base metal, 28 is a brazing material, 29 is a sheet of tantalum, columbium, or zirconium, 30 is a brazing material, 31 is a sheet of molybdenum and 32 is a cover plate, preferably steel or stainless steel. The cover plate is hermetically sealed to the base plate such as by welding 33. The cover plate and base plate extend beyond the outer edges of the molybdenum and tantalum, columbium, or zirconium sheets to provide corridor 34 around the edges. An outlet, or outlets, 35 are provided to create the vacuum. The arrangement of Figure 3 provides a rapid and complete removal of air and absorbed gases released on heating the cladding sandwich. The cover plate prevents air from entering the sandwich through imperfections that may exist in the molybdenum sheet.

The sandwich structure of Figure 4 may be used, if desired, to produce two molybdenum-clad plates simultaneously. In Figure 4, two base plates 36 are placed together as shown in the drawing in section, brazing materials 37 are placed in contact with the outer faces of the base plates, over the brazing materials are placed sheets of tantalum, columbium, or zirconium 38, over said sheets are placed brazing material 52, then molybdenum 39 and over the molybdenum is placed cover sheets 40. By extending the cover plates beyond the outer edges of the other metal plates and hermetically sealing the cover edges with plates 41 a corridor 42 is formed. Opening 43 is provided to create a vacuum in the sandwich. By heating the sandwich as previously described and subsequently cooling it, two molybdenum-clad plates are produced.

In addition to molybdenum-clad substantially flat plates other such clads of different form may be produced directly using the described conditions by proper arrangement of the cladding sandwich. Tubes internally clad with molybdenum may be made such as by the cladding sandwich of Figure 5 wherein 44 is a molybdenum tube, 45 is brazing material, 46 is a tantalum, columbium, or zirconium tube, 51 is more brazing material, 47 is a base metal tube, 48 is an outlet which continues to the surface of the molybdenum 50, and 49 is a means for drawing a vacuum in the sandwich.

The following example is added to illustrate, but not limit, the invention.

*Example*

A cladding sandwich was made up as in Figure 3 out of a 12" x ¼" x 12" carbon steel plate, a 6" x 0.016" x 6" tantalum sheet, a 6" x 0.016" x 6" molybdenum sheet, 2.5 square feet of 0.0025 copper brazing foil and a 11½" x 20 gauge x 11½" stainless steel sheet. The sandwich was evacuated to a vacuum of 29.4" of mercury and charged into a furnace preheated to 2100° F. It was brought to 2030° F. in nine minutes, held at this temperature for ten minutes and then cooled slowly to room temperature. The sandwich was sawed open. The bonds were found to be complete, continuous and entirely satisfactory.

Various changes and modifications of the invention can be made and to the extent that such variations incorporate the spirit of this invention they are intended to be included within the scope of the appended claims.

What is claimed is:

1. The process which comprises putting in face-to-face contact, respectively, a ferrous base-metal sheet, a layer of brazing material, a sheet of tantalum, a layer of brazing material, and a sheet of molybdenum, said brazing material being capable of wetting and brazing the respective metals between which it is inserted, to produce a cladding sandwich, hermetically sealing the resulting cladding sandwich, evacuating the sandwich until a substantial vacuum is attained therein, heating the sandwich at least until the brazing material is molten, cooling the sandwich, releasing the vacuum and removing the seal, thereby producing a molybdenum clad base metal having a tantalum layer in between.

2. The process which comprises putting in face-to-face contact, respectively, a ferrous base-metal sheet, a layer of brazing material, a sheet of zirconium, a layer of brazing material, and a sheet of molybdenum, said brazing material being capable of wetting and brazing the respective metals between which it is inserted to produce a cladding sandwich, hermetically sealing the resulting cladding sandwich, evacuating the sandwich until a substantial vacuum is attained therein, heating the sandwich at least until the brazing material is molten, cooling the sandwich, releasing the vacuum and removing the seal, thereby producing a molybdenum clad base metal having a zirconium layer in between.

3. The process which comprises covering a ferrous metal base sheet with a brazing layer of copper, placing over the copper layer a sheet of tantalum in face-to-face arrangement, placing over the sheet of tantalum a brazing layer of copper, placing over the copper layer a sheet of molybdenum in face-to-face arrangement, placing over the molybdenum sheet a metal cover plate in face-to-face arrangement with the molybdenum sheet, said cover plate and base sheet extending beyond the periphery of the tantalum and molybdenum sheets, hermetically sealing the cover plate to the base sheet so that a corridor is formed around the tantalum-molybdenum edges, evacuating the resulting cladding sandwich by means of an outlet leading from the corridor until a substantial vacuum is attained in the sandwich, heating the sandwich while under vacuum until the brazing copper is at least molten, cooling the sandwich, releasing the vacuum and removing the cover plate, thereby producing a molybdenum-clad base metal having a tantalum layer in between.

4. The process which comprises putting in face-to-face contact, respectively, a ferrous base-metal sheet, a layer of brazing material, a sheet of columbium, a layer of brazing material, and a sheet of molybdenum, said brazing material being capable of wetting and brazing the respective metals between which it is inserted, to produce a cladding sandwich, hermetically sealing the resulting cladding sandwich, evacuating the sandwich until a substantial vacuum is attained therein, heating the sandwich at least until the brazing material is molten, cooling the sandwich, releasing the vacuum and removing the seal, thereby producing a molybdenum clad base metal having a columbium layer in between.

5. A ductile molybdenum clad product in the form of a plate comprising in the following order and in face-to-face contact, a sheet of a ferrous base metal, a layer of brazing material, a sheet of tantalum, a layer of brazing material, and a sheet of molybdenum, said metal sheets being integrally and continuously bonded together by the brazing material.

6. A ductile molybdenum clad product in the form of a plate comprising in the following order and in face-to-face contact, a sheet of a ferrous base metal, a layer of brazing material, a sheet of zirconium, a layer of brazing material, and a sheet of molybdenum, said metal sheets being integrally and continuously bonded together by the brazing material.

7. A ductile molybdenum clad product in the form of a plate comprising in the following order and in face-to-face contact, a sheet of a ferrous base metal, a layer of brazing material, a sheet of columbium, a layer of brazing material, and a sheet of molybdenum, said metal sheets being integrally and continuously bonded together by the brazing material.

8. The clad product of claim 5 in which the brazing material is copper.

9. The clad product of claim 6 in which the brazing material is copper.

10. The clad product of claim 7 in which the brazing material is copper.

11. The process of claim 2 in which the brazing material is copper.

12. The process of claim 4 in which the brazing material is copper.

References Cited in the file of this patent

UNITED STATES PATENTS

| | | |
|---|---|---|
| 1,892,819 | Van Gessel | Jan. 3, 1933 |
| 2,160,559 | Orr | May 30, 1939 |
| 2,387,903 | Hensel | Oct. 30, 1945 |
| 2,445,858 | Mitchell et al. | July 27, 1948 |
| 2,697,130 | Korbelak | Dec. 14, 1954 |
| 2,713,196 | Brown | July 19, 1955 |
| 2,756,489 | Morris | July 31, 1956 |
| 2,786,265 | Keay | Mar. 26, 1957 |